US008229869B2

(12) United States Patent
Bagley et al.

(10) Patent No.: US 8,229,869 B2
(45) Date of Patent: Jul. 24, 2012

(54) CONSTRAINT PROCESSING WITH ZERO VALUE HANDLING

(75) Inventors: Claire M. Bagley, Carlisle, MA (US); Joyce Ng, Sunnyvale, CA (US)

(73) Assignee: Oracle International Corporation

( * ) Notice: Subject to any disclaimer, the term of this patent is extended or adjusted under 35 U.S.C. 154(b) by 702 days.

(21) Appl. No.: 12/427,914

(22) Filed: Apr. 22, 2009

(65) Prior Publication Data

US 2010/0274747 A1    Oct. 28, 2010

(51) Int. Cl.
G06E 1/00 (2006.01)
G06E 3/00 (2006.01)
G06F 15/18 (2006.01)
G06G 7/00 (2006.01)

(52) U.S. Cl. ........................................ 706/19
(58) Field of Classification Search .................. None
See application file for complete search history.

(56) References Cited

U.S. PATENT DOCUMENTS

| | | | |
|---|---|---|---|
| 7,069,537 B2 | 6/2006 | Lazarov | |
| 7,333,968 B2 | 2/2008 | Geller et al. | |
| 2002/0107749 A1 | 8/2002 | Leslie et al. | |
| 2002/0143653 A1 | 10/2002 | DiLena et al. | |
| 2002/0166089 A1 | 11/2002 | Noy | |
| 2003/0172099 A1* | 9/2003 | Walster et al. | 708/446 |
| 2004/0019852 A1 | 1/2004 | Purvis | |
| 2005/0198621 A1 | 9/2005 | Tillmann et al. | |
| 2005/0278271 A1 | 12/2005 | Anthony et al. | |
| 2006/0235817 A1* | 10/2006 | Wong et al. | 707/1 |
| 2007/0094184 A1 | 4/2007 | Emek et al. | |

OTHER PUBLICATIONS

"Mathematical singularity", http://en.wikipedia.org/wiki/Mathematical_singularity, 2007, pp. 3.*
"Flag (computing)", http://en.wikipedia.org/wiki/Flag_%28computing%29, 2007, pp. 1.*
Michel et al. "Solving Constraints over Floating-Point Numbers", T. Walsh (Ed.): CP 2001, LNCS 2239, pp. 524-538, 2001.*
Frühwirth, Thom et al., "Principles of Constraint Systems and Constraint Solvers", Archives of Control Sciences: Special Issue on Constraint Progamming, 16(2) http://www.infomatik.uni-ulm.de/pm/mitarbeiter/fruehwirth/Papers/acs-systems3.pdf, 2006, pp. 1-29.
Lhomme, Olvier, "Consistency Techniques for Numeric CSPs", Proceedings in IJCAI-93 pp. 232-238, 1993 Chambery, France.
Selectica, "Selectica Configuration", Solution Overview, pp. 2, 2005, Selectica, Inc., San Jose, CA.

(Continued)

Primary Examiner — Jeffrey A Gaffin
Assistant Examiner — Li-Wu Chang
(74) Attorney, Agent, or Firm — Squire Sanders (US) LLP

(57) ABSTRACT

Systems and methods for managing floating point variables are described in the present disclosure. According to one example, an embodiment of a method is described. The method comprises providing a floating point variable having a domain that includes a flag representing whether a specific value is included in or excluded from the domain of the floating point variable. The method also includes analyzing a constraint on the floating point variable to determine if the constraint excludes the specific value from the domain of the floating point variable. A value of the flag is manipulated to indicate that the specific value is excluded from the domain of the floating point variable if it is determined that the constraint excludes the specific value. In some cases, the specific value can be the value zero, for example.

17 Claims, 6 Drawing Sheets

OTHER PUBLICATIONS

ILOG, "ILOG Configurator, Powering online product and service configuration applications", Product Datasheet, pp. 2, Mar. 2005 ILOG.S.A.

Oracle, "Oracle Configurator", Oracle Data Shee, 2008, Oracle, pp. 4.

Tacton, "Tacton Sales Configurator—Bridging the gap between engineering and sales for selling customized products.", http://www.tacton.com/templates/page_68.aspx?epslanguage=EN, pp. 2, 2007, Tacton Systems AB, Sweden.

Benhamou, Frédérick et al., "Applying Interval Arithmetic to Real, Integer and Boolean Constraints", Journal of Logic Programmin, 32(1), pp. 1-28, 1997.

Fleischanderl, Gerhard et al., "Configuration Large Systems Using Generative Constraint Satisfaction", IEEE, pp. 59-68, No. 1094-7167/98, pp. 59-68, Jul./Aug. 2008, IEEE.

Mittal, Sanjay et al., "Dynamic Constraint Satisfaction Problems", Proceedings of the Eighth National Conference on Artificial Intelligence, 1996, pp. 25-32.

Stumptner, Markus et al., "Generative Constraint-Based Configuration of Large Technical Systems", Artificial Intelligence of Engineering Desigh, analysis and Manufacturing, pp. 307-320, No. 12, 1998, Cambridge University Press, USA.

Gelle, Esther et al., "Solving Methods for Conditional Constraint Satisfaction", IJCAL, 2003.

Sabin et al.; "Configuration As Composite Constraint Satisfaction"; AAAI (1996); pp. 153-161.

* cited by examiner

CONSTRAINT PROCESSING WITH ZERO VALUE HANDLING

TECHNICAL FIELD

The present disclosure generally relates to the handling of floating point variables, which may be present, for example, in constraint satisfaction problems. More particularly, the embodiments described herein relate to systems and methods for acknowledging a specific value, such as the value zero, in the domain of a floating point variable.

BACKGROUND

A constraint satisfaction problem ("CSP") is a mathematical problem that can be solved by satisfying all the constraints of the problem such that the domain of each variable of the problem is narrowed down to a single value without violating any constraint. Each variable has a domain of possible "values," such as a range of numerical values, an enumerated set of values, a set of items, true/false, etc. Limitations among the variables are expressed as constraints, which act to limit the values that a variable may take.

A constraint solver uses reasoning techniques to find solutions to the CSPs, if any solutions exist. A solution is a state in which the domain of each variable is limited to a single value and no constraint has been violated. A reasoning process includes an "inference" operation, which includes the propagation of the constraints in the attempt to reduce the domain of participating variables, and a "search" operation, which includes making an assignment of a value to each of the variables. By applying reasoning techniques, the constraints are evaluated in order to reduce the domains of the variables. When each domain of the variables is reduced down to a single value without violating any constraints, then a solution to the CSP is found. Thus, a solution to a CSP is a unique assignment of all the variables that satisfies all the constraints of the problem. When a solution is not found, it can be said that the CSP has no solution, or that the CSP is not satisfiable.

"Constraint programming" is a paradigm for solving combinatorial problems using artificial intelligence, computer science, programming languages, operations research, etc. Currently, constraint programming is applied with success to many different technologies, such as scheduling, planning, vehicle routing, configurations, networks, bioinformatics, etc.

An example of a CSP that normally has a unique solution is Sudoku. In a typical Sudoku puzzle, squares are arranged in a 9×9 grid, where each of the 81 squares represents variables. Each variable is usually defined as an integer having a domain ranging from 1 to 9. The typical Sudoku puzzle includes a first constraint that each row in the grid includes all of the integers 1 through 9 without repeating an integer. A second constraint is that each column in the grid includes all the integers 1 through 9 without repeating an integer. A third constraint is that each of nine 3×3 blocks that are arranged in the grid includes all the integers 1 through 9 without repeating an integer. Given the values for several variables throughout the grid, the remaining variables (squares) can be evaluated using various inference techniques, such as a process of elimination, until a solution to the puzzle can be found. In this example, finding the solution to the Sudoku puzzle includes the filling of the squares with the integers 1 through 9 without violating any of the three constraints.

Variables being processed in CSPs can be "floating point variables." A floating point variable is a variable that includes floating points ranging from a minimum value to a maximum value. A "floating point" refers to a numeric value having a string of digits and a decimal point that "floats" with respect to the string of digits. Regarding the representation of floating point variables in CSPs, the domain of the floating point variable is defined by the minimum and maximum limits, or bounds, of the domain, rather than trying to store all the intermediate values, which would require a very large amount of storage. For example, there are more than $10^{18}$ floating point values between a small interval from −1 to 1. FIG. 1 shows an example of the data structure of a conventional domain 10 of a floating point variable. Floating point variable domain 10 contains a minimum bound 12 and a maximum bound 14.

SUMMARY

The present disclosure describes several embodiments of systems, methods, and processing logic. Regarding one particular embodiment, a method for managing floating point variables is described. The method includes providing a floating point variable having a domain that includes a flag representing whether a specific value is included in or excluded from the domain of the floating point variable. The method also includes analyzing a constraint on the floating point variable to determine if the constraint excludes the specific value from the domain of the floating point variable. A value of the flag is manipulated to indicate that the specific value is excluded from the domain of the floating point variable if it is determined that the constraint excludes the specific value.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

DETAILED DESCRIPTION

Figure 1:
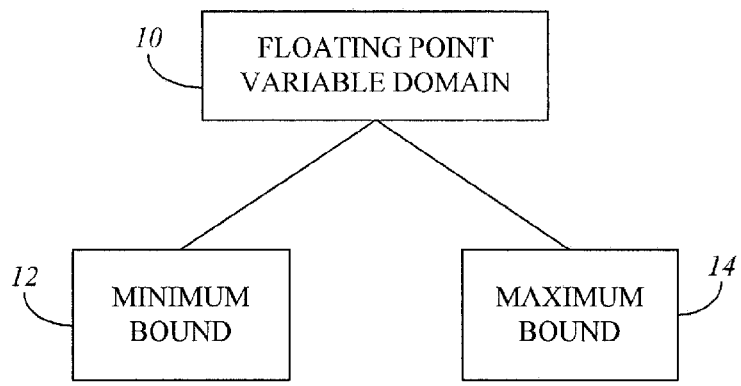
FIG. 1 is a diagram illustrating a conventional data structure of a floating point variable domain.

In a constraint satisfaction problem ("CSP"), solutions are obtained by satisfying constraints that limit the values of the problem's variables. To solve the CSP, iterative analysis can be made to the constraints to narrow the domain of each variable until a solution is found or until it can be proved that there is no solution. CSPs may include any types of variables, such as, for example, floating point variables, integer variables, set variables (variables having domains that include a predefined set of values or objects), etc. With each constraint, a solver uses reasoning processes to remove the values of the domain that do not satisfy the constraint. A solution is found when each variable is assigned a value that satisfies all the constraints of the problem. Typically, a computer or other processing device may be needed to solve more complex CSPs.

The systems and methods described herein refer to the underlying computer software issues regarding the handling of floating point variables. A floating point variable includes a domain having a range of values defined by a minimum bound and maximum bound. Normally, the domain of a conventional floating point variable does not record any intermediate values between the minimum bound and maximum bound.

Due to the limitations of binary representation, the implementation of real numbers for floating points in computer systems is an imprecise approximation. Certain mathematical operations on floating points can introduce rounding errors. Some CSP systems rely on techniques to compensate for this imprecision. One such technique is known as extended interval. This specialized handling to compensate for errors introduced by the imprecise approximation comes at an additional computation and memory cost.

Most reasoning processes only reason over the bounds of the domain of a floating point variable, but not within. For example, for a floating point variable with domain [−1.5 . . . 3.5], the reasoning would typically only happen over −1.5 and 3.5, but not over the internal values between the boundaries. It is not usually possible to eliminate specific values from the domain of a floating point variable. More particularly, there are no known conventional systems that are able to eliminate the value zero from a domain of a floating point variable. The problem with reasoning over floating point variables in a constraint system is due to a combination of the imprecision of the representation of floating points in a computer system and the inherent difficulty to reason efficiently over continuous ranges.

It should be understood that the value zero (0.0) in a domain of floating point numbers may have a specific meaning. For example, zero can mean "none," "nothing," "empty," etc. In some cases, a number may be positive or negative, but not zero. In any of these cases, it may be desirable to specifically acknowledge the exact representation of the value zero in a domain of floating point numbers. Particularly, a special flag bit can be created for each floating point variable, wherein the flags indicate whether or not the value zero is part of the domain of the respective floating point variable. Therefore, if inference can be made that would exclude the value zero from the domain or if inference cannot be made that would not exclude the value zero from the domain, then the flag can be manipulated to a value that indicates exclusion of the value zero. In some embodiments, the bit can be given an initial value that indicates that zero is included and, unless it can eventually be inferred that the value is excluded, the initial value is maintained.

Although many of the examples mentioned in the present disclosure describe floating point variables used in CSPs, it should be understood that the systems and methods of managing floating point variables as described in the present disclosure may also include applications in other systems other than CSPs that process floating point variables. In addition, attention is given in the present disclosure to the specific value zero. However, it should be understood that other values, such as the value one, can also be singled out as well for the special recognition of the inclusion or exclusion of these other specific values in the domains of floating point variables. It should therefore be recognized that, although the examples described herein pertain to the recording of the inclusion or exclusion of the value zero within a floating point domain, other values other than zero can be handled in a similar manner if desired, as would be understood by one of ordinary skill in the art.

Figure 2:
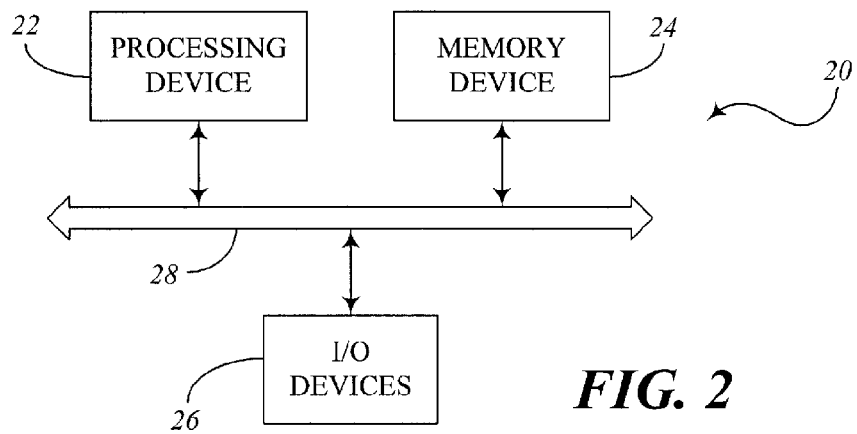
FIG. 2 is a block diagram illustrating a computing system according to one embodiment.

FIG. 2 is a block diagram of an embodiment of a computing system 20. Particularly, computing system 20 may be a computer, data processing system, or other suitable electronic device for executing logic instructions, e.g., software applications. In the embodiment shown in FIG. 2, computing system 20 includes a processing device 22, a memory device 24, and input/output ("I/O") devices 26, each interconnected via a bus interface 28.

Generally, computing system 20 can be configured to handle floating point variables. In some embodiments, the floating point variables can have an extra bit originally incorporated into its data structure. In other embodiments, computing system 20 can analyze the presence of floating point variables anywhere in the system, and, when detected, can add an extra bit to the floating point variable (see FIGS. 4A and 4B) or to the domain of the floating point variable (see FIGS. 4C and 4D). The extra bit in these examples acts as a flag to indicate whether or not the value zero is included within the domain of the floating point variable. If the value zero is not between the minimum and maximum bounds of the domain (i.e., the minimum and maximum bounds are either both negative or both positive), this extra bit would not be needed in this case and would not normally be considered.

However, in other embodiments, computing system 20 can determine whether a floating point variable contains a domain that ranges from a negative number to a positive number. In other words, it is determined whether the floating point variable by definition includes, among other values, the value zero. This determination can be made before any constraints are considered. If the floating point variable does include zero, then the special flag is added to this floating point variable or to the domain of the floating point variable. If it does not include zero, then the flag is not needed and is not added to this floating point variable. Therefore, in this alternative implementation, the flag is only added to those floating point variables that normally include the value zero. Normally, the flag is initially manipulated to indicate that the value zero is included.

After adding and initializing the flag bit, computing system 10 is further configured to analyze any number of constraints or rules on the floating point variable. The constraints may be part of a CSP solving system or other constraint-based or rules-based system. If a constraint infers that the value of the floating point variable does not equal zero, then the flag is manipulated to a value used to indicate that the value zero is excluded from the domain of the floating point variable. Otherwise, if no constraint or rule excludes zero, then the flag is manipulated to a value used to indicate that the value zero is included in the domain, if the flag is not already indicative of the inclusion of zero at the beginning when the problem is first loaded. In this way, reasoning can be made over the value zero in a floating point variable when zero is within the range of values of the domain.

Processing device 22 may be a general-purpose or specific-purpose processor or microcontroller. Memory device 24 may include one or more internally fixed storage units, removable storage units, and/or remotely accessible storage units. The storage units can be configured to store information, data, instructions, and/or software code. The storage units may include any suitable combination of volatile memory and/or non-volatile memory. Input/output devices 26 may include input mechanisms such as keyboards, keypads, cursor control devices, or other data entry devices. The input mechanisms enable a user to enter information or instructions. Input/output devices 26 may also include output devices such as computer monitors, display screens, audio output devices, etc., for communicating information to the user.

Figure 3:
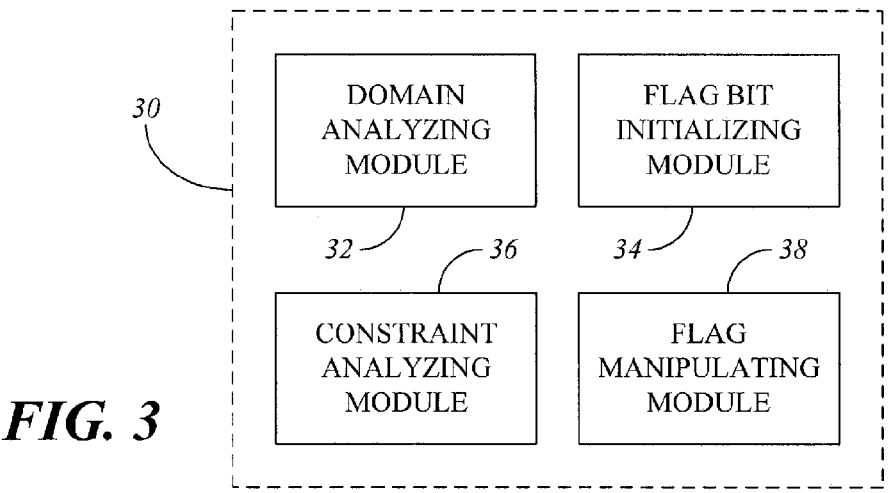
FIG. 3 is a block diagram illustrating a floating point variable handling module according to one embodiment.

FIG. 3 is a block diagram showing an embodiment of a floating point variable handling module 30. In some embodiments, floating point variable handling module 30 can be a part of a CSP solving module, which can be configured to solve a CSP. In other embodiments, floating point variable handling module 30 can be a part of a constraint-based configurator, such as a product configurator, which can be used for guiding a buyer through a set of products and options. In this case, the constraint-based configurator can map a list of customer selections in real time to available sets of products, product features, product options, services, service options, and so on. These systems may include constraint-based systems, rules-based systems, or other inference processing systems.

The embodiments of floating point variable handling module 30 described in the present disclosure can be implemented in hardware, software, firmware, or a combination thereof. When implemented in software or firmware, floating point variable handling module 30 can be stored in memory device 24 (FIG. 2) and executed by processing device 22. Alternatively, when implemented in hardware, floating point variable handling module 30 can be implemented in processing device 22 using discrete logic circuitry, an application specific integrated circuit (ASIC), a programmable gate array (PGA), a field programmable gate array (FPGA), or any combination thereof.

Floating point variable handling module 30, which can be stored partially or fully in memory device 24, in addition to any other software, programs, or computer code including executable logical instructions as described herein, can be embodied in a computer-readable medium for execution by any suitable processing device. The computer-readable medium as described herein can include one or more suitable physical media components that can store the software, programs, or computer code for a measurable length of time.

In the embodiment of FIG. 3, floating point variable handling module 30 includes a domain analyzing module 32, a flag bit initializing module 34, a constraint analyzing module 36, and a flag manipulating module 38. Floating point variable handling module 30 can be used to analyze any or all of the floating point variables used in computing system 20.

Domain analyzing module 32 is configured to analyze the domain of floating point variables under consideration. In some embodiments, domain analyzing module 32 can check the definition domain of a floating point variable to determine if the range of the domain includes a continuous range of values that would by definition contain the value zero (0.0). One way that this can be determined is by analyzing whether one of the bounds of the range is negative and the other is positive. Domain analyzing module 32 can operate to analyze the domain of a floating point variable in this manner before any constraints are analyzed with respect to that floating point variable. Thus, this determination of whether a domain contains the value zero at this point is based only on the minimum and maximum bounds and not dependent on any constraint that might exclude the value zero, since the constraints would typically be analyzed at a later time.

Flag bit initializing module 34 can be configured to perform different tasks based on how a flag bit is to be used. In a first set of embodiments, a flag bit can be created for a floating point variable such that the flag bit is directly associated with the floating point variable, but not part of the domain itself. In a second set of embodiments, a flag bit can be part of the floating point domain itself along with the minimum and maximum bounds. In either case, the flag bit can represent a ZeroInclusion flag or a ZeroExclusion flag, depending on the particular design. In a third set of embodiments, flag bit initializing module 34 can be configured to create the special bit only when it is determined before constraint processing that a particular floating point variable has a domain that by definition would include the value zero. In other words, the bit is only added for those variables that have a negative minimum bound and positive maximum bound.

Flag bit initializing module 34 is also configured to perform initialization procedures for the flag bit in order that the flag bit is a part of or associated with the floating point variable domain and can be accessed as needed. Initially, the flag bit can be defaulted to a certain value to indicate either that zero is included or zero is excluded. Then, during constraint processing, the bit can then be manipulated to 0 or 1, as appropriate, to indicate whether or not the value zero is included in the domain of the floating point variable. When domain analyzing module 32 determines that a floating point variable has a domain that initially includes zero, then flag bit initializing module 34 can be notified in this case and can add and/or initialize the flag bit as needed.

The first value of the flag may be represented by a value and/or component including "yes," "included," "true," "1," or the like, to indicate that the value zero is a part of the domain. A second value of the binary flag may be represented by a value and/or component including "no," "excluded," "false," "0," or the like, to indicate that the value zero is not part of the domain. Alternatively, a low value may indicate "not excluded" and a high value may indicate "excluded."

Constraint analyzing module 36 analyzes any constraints that apply to the floating point variables. In some embodiments, constraint analyzing module 36 may be part of or associated with other constraint processing modules. Constraint analyzing module 36 may be configured to analyze constraints for the purpose of determining whether zero can be removed from the domain of a floating point variable. In this respect, if a domain includes only positive values or only negative values, then the analysis of whether the value zero is included or excluded for the respective variable is irrelevant. Nonetheless, the constraints are analyzed to determine if one or more of the constraints can be processed to specifically exclude the value zero from the domain. If so, flag manipulating module 38 is instructed to change the flag to a value "excluded" or to another value for indicating that the value zero is excluded from that domain.

In one example, suppose a floating point variable has the domain [−10.5 . . . 6.3], which ranges from −10.5 to 6.3. When domain analyzing module 32 analyzes this domain, it can be acknowledged that zero is initially part of the domain since the minimum bound is negative and the maximum bound is positive. Normally, all values within the bounds are considered to be possible valid values for the variable. Flag bit initializing module 34 can be configured to create and initialize the special flag bit for this particular floating point variable, if the special flag bits are not already incorporated into each floating point variable. Also, the value of the flag can be initially manipulated to indicate that zero is included for those floating point variables that are categorized as normally including the value zero, such as the floating point variable with domain [−10.5 . . . 6.3].

Then, during processing of constraints, the constraints can be analyzed by constraint analyzing module 36, including an attempt to determine if it can be inferred from at least one of the constraints that zero is excluded. For example, a constraint may simply stipulate that the floating point variable F does not equal zero, or F≠0. In some cases, other more complex inference processing methodologies may be required to infer that zero is excluded. For example, one or more constraints may exist that infer that either F<0 or F>0. Regardless of how it can be inferred, if exclusion of the value zero can be inferred, flag manipulating module 38 is instructed to manipulate the flag to a value indicating that zero is excluded. By acknowledging that zero is included or excluded, this exact value can be reasoned over for the benefit of constraint processing even though the value zero would normally be embedded within the outer bounds of the domain. The flag bit can therefore be referred to when necessary in order to determine whether or not zero is still part of the domain.

In order to illustrate the contrast between a floating point variable having special zero handling and one that does not, consider an example of a CSP where two variables are defined. A first variable is a floating point variable F having a domain [−10.5 . . . 6.3] and a second variable is a Boolean variable A having a domain {true, false}. Suppose a first constraint is defined as "F≠0" and a second constraint is defined as "F≠0 implies exclusion of A."

Without the special zero handling, the reasoning over the constraint F≠0 has no effect to reduce the domain of variable F because the system does not record or reason over any gap within the continuous range of the floating point variable domain. Consequently, the evaluation of the second constraint that "F≠0 implies exclusion of A" does not reduce the domain of the variable A because zero is still considered to be in F's domain. Not only does the second constraint fail to reduce the domain of A in the case without zero handling, but also the second constraint would be checked over and over until the domain is eventually bound to a single value and the final assignment of the variable is validated or not. The repeated checking would thereby delay the detection and reporting of the inconsistency, if any.

On the other hand, with the special handling of zero, the removal of zero can be recorded and reasoned over. Furthermore, zero removal can be reasoned over at an earlier stage during the inference process. Also, the domain of flag A can be reduced to false. It can be seen from this example that the possibility of removing the value zero from the domain of a floating point variable can impact the inferences made with respect to other variables as well. As a result, the inference power can be strengthened by recording the inclusion or exclusion of the value zero in the floating point variable domain.

The following is another example of zero handling. Suppose that X is a floating point variable with a domain defined over [−10.3 . . . 7.8], Y is a floating point variable with a domain defined over [0.5 . . . 5.6], and Z is an integer variable with a domain defined over [0 . . . 2]. Also, suppose A is a Boolean variable with a domain defined over {false, true} and B is a Boolean variable with a domain defined over {false, true}. Suppose there are also a three constraints, where a first constraint ct1 states that A implies (Z=0), a second constraint ct2 states that Z≠X, and a third constraint ct3 states that (X≠0) implies B.

Firstly, focusing on the domains of the floating point variables X and Y, the domains include the following: X has a minimum bound=−10.3 and a maximum bound=7.8. A ZeroExclusion flag=false, where zero at this time is not excluded and is a possible value of the domain. Y has a minimum bound=0.5 and a maximum bound=5.6. The ZeroExclusion flag=don't care, since by definition zero is not part of the domain.

When ct1 and ct2 are first processed, no reduction of the domains is possible. Suppose the user selects the Boolean A, therefore setting it to true. The setting reduces the domain of the variable A that propagates further to any constraints in which this variable is participating. This means that ct1 is checked, which propagates to Z, and Z's domain is reduced to the single value 0. All constraints operating on the variables which domain changed (Z in this case) are then checked. This means that now ct2 propagates to X. That is, only the value 0 is removed from the domain of X. In other words, the bounds do not change, but the ZeroExclusion flag is set to true.

All constraints operating on the variables which domain changed (X in this case) are then checked. This means that ct3 is checked, which defines that the expression (X≠0) is satisfied (it is true), which then propagates through ct3 to B, and B's domain is reduced to true. As a result of this processing, the state of the variables after propagation of the user selection is now X=[−10.3 . . . 7.8] {not 0}, Y=[0.5 . . . 5.6], Z={0}, A={true}, and B={true}.

The flag bit is associated with the respective floating point variable in any suitable manner. For instance, the flag can be made a part of the floating point variable, such that the floating point variable will consist of a minimum bound, a maximum bound, and a ZeroInclusion. Flag manipulating module 38 initially manipulates the value of the flag to "included" or to any other value for indicating that the value zero is included. In other embodiments, the flag can represent whether or not the value zero has been removed, such that the flag is a ZeroExclusion flag, where 0 indicates that the value zero is not removed and 1 indicates that the value zero is removed. When the flag bits are established and initialized for the floating point variables, then the constraints can be analyzed to see if the constraints affect whether or not the value zero is excluded from the intermediate values of the domain.

Figure 4A:
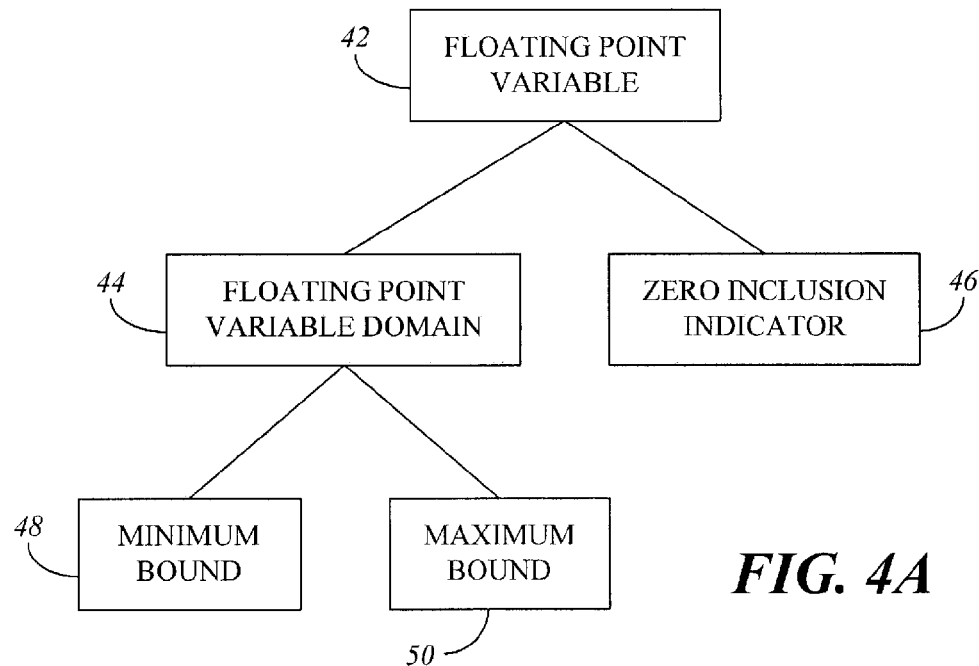
FIG. 4A is a block diagram illustrating a data structure of the domain of a floating point variable, according to a first embodiment.

FIG. 4A is a block diagram of a first embodiment of a data structure of a domain of a floating point variable. In this embodiment of the data structure, a floating point variable 42 comprises a floating point variable domain 44 and a zero inclusion indicator 46. Zero inclusion indicator 46 is therefore not a part of domain 44 of floating point variable 42, but is separate from (yet associated with) floating point variable 42 in this case. Floating point variable domain 44 contains a minimum bound 48 and a maximum bound 50. Zero inclusion indicator 46 records whether zero is included in the domain or if it not included (has been removed from the domain). Thus, zero inclusion indicator 46 can enable further inference over the value zero in such a domain, thereby strengthening the inference power.

Figure 4B:
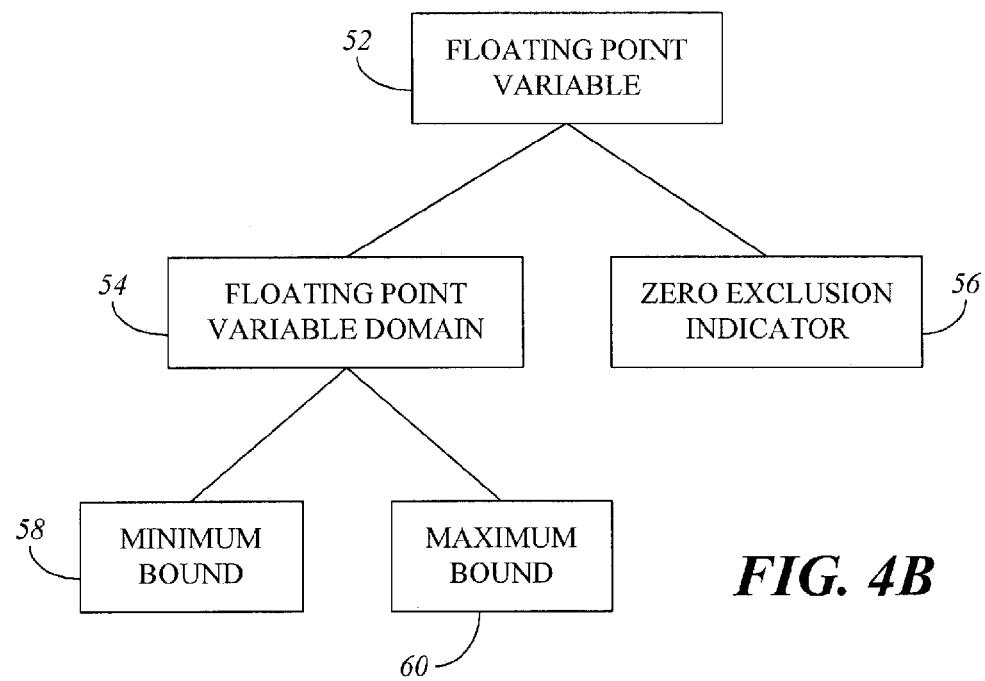
FIG. 4B is a block diagram illustrating a data structure of the domain of a floating point variable, according to a second embodiment.

FIG. 4B is a block diagram of a second embodiment of a data structure of a domain of a floating point variable. In this embodiment of the data structure, a floating point variable 52 comprises a floating point variable domain 54 and a zero exclusion indicator 56. Zero exclusion indicator 56 is therefore not a part of domain 54 of floating point variable 52, but is separate from (yet associated with) floating point variable 52 in this case. Floating point variable domain 54 includes a minimum bound 58 and a maximum bound 60. Zero exclusion indicator 56 records whether zero is excluded from the domain or if it is not excluded. With zero exclusion indicator 56, it is possible to make inference over the value zero in such a domain, thereby strengthening the inference power.

Figure 4C:
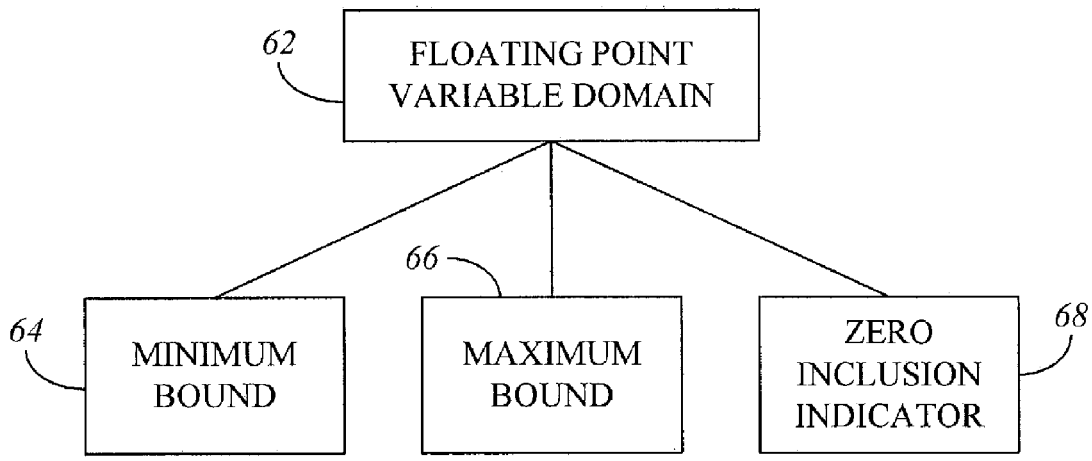
FIG. 4C is a block diagram illustrating a data structure of the domain of a floating point variable, according to a third embodiment.

FIG. 4C is a block diagram of a third embodiment of a data structure of a domain of a floating point variable. In this embodiment of the data structure, a floating point variable domain 62 comprises a minimum bound 64, a maximum bound 66, and a zero inclusion indicator 68. In this case, zero inclusion indicator 68 is part of floating point variable domain 62. Zero inclusion indicator 68 records whether or not the value zero is included in floating point variable domain 62, which can enable further inference over the value zero in such a domain, thereby strengthening the inference power.

Figure 4D:
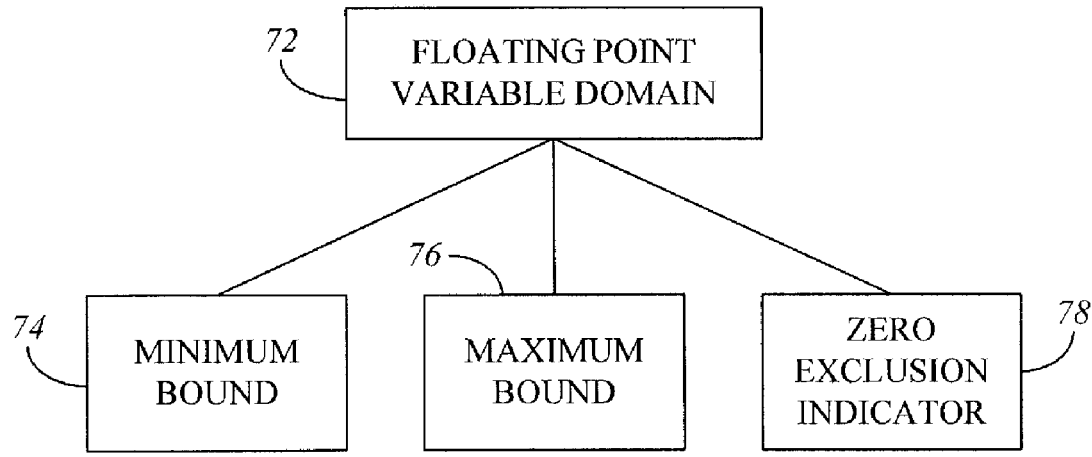
FIG. 4D is a block diagram illustrating a data structure of the domain of a floating point variable, according to a fourth embodiment.

FIG. 4D is a block diagram of a fourth embodiment of a data structure of a domain of a floating point variable. In this embodiment of the data structure, a floating point variable domain 72 comprises a minimum bound 74, maximum bound 76, and a zero exclusion indicator 78. In this case, zero exclusion indicator 78 is part of floating point variable domain 72. Zero exclusion indicator 78 records whether or not zero is excluded from floating point variable domain 72, which can enable further inference over the value zero in such a domain, thereby strengthening the inference power.

Figure 5:
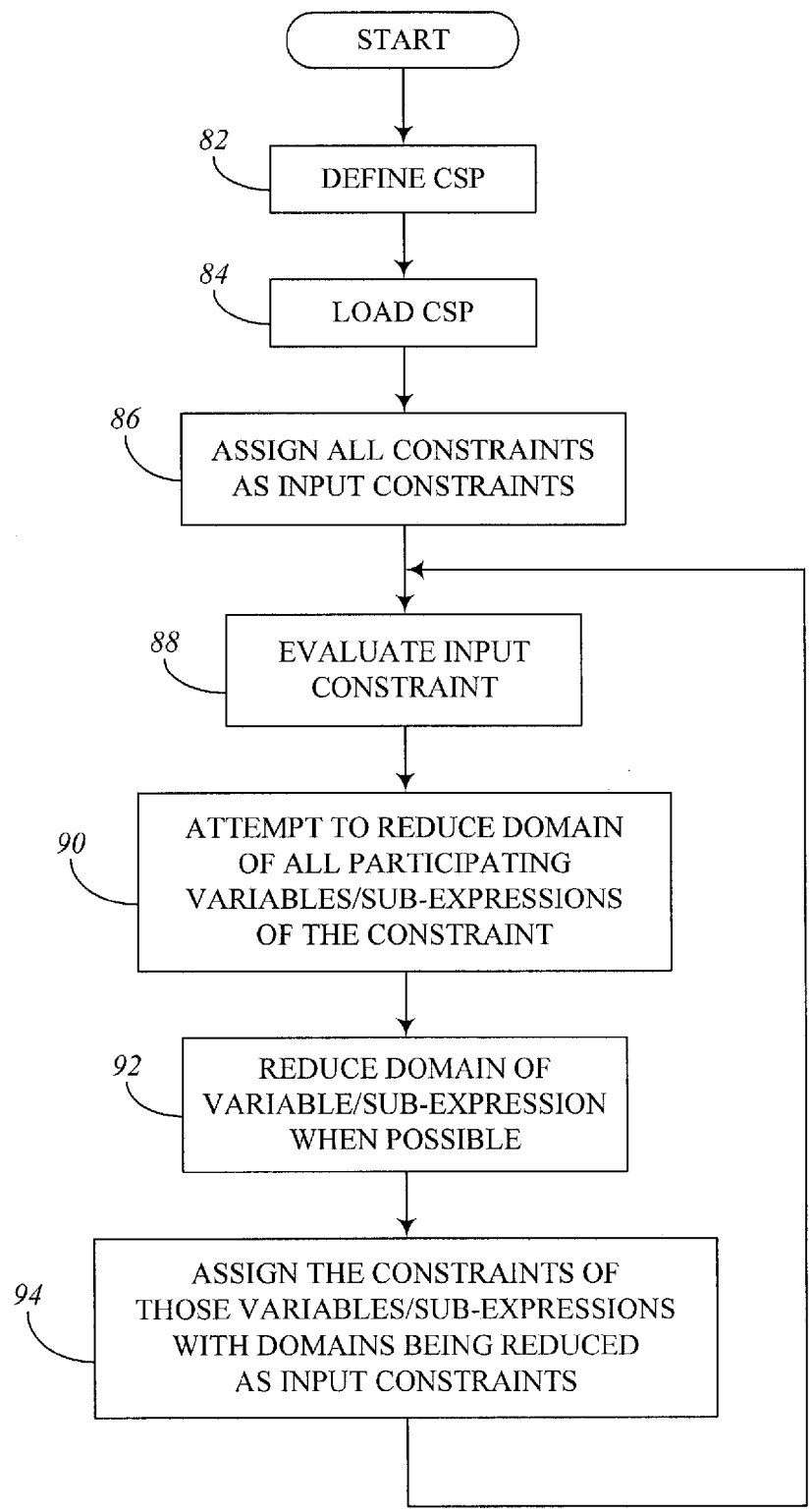
FIG. 5 is a flow diagram illustrating a method for processing constraints, according to one embodiment.

FIG. 5 is a flow diagram of an embodiment of a method for processing constraints. At the beginning, a CSP is defined, as indicated in block 82, and then the CSP is loaded, as indicated in block 84. Then, all the constraints are assigned as input constraints, as indicated in block 86. According to block 88, an input constraint is evaluated. As indicated in block 90, an attempt is made to reduce the domain of all participating variables or sub-expressions of the constraint. As indicated in block 92, the domain of the variable or sub-expression is reduced when possible (as a result of constraint evaluation). As indicated in block 94, the constraints of those variables or sub-expressions with domains being reduced are assigned as input constraints. After this procedure, the method returns back to block 88 for evaluation of more input constraints. This loop is repeated until there is no further domain reduction, i.e., no more input constraints. It can also run again if the user sets the domain of a variable to a single value (which can also be a form of domain reduction).

Figure 6:
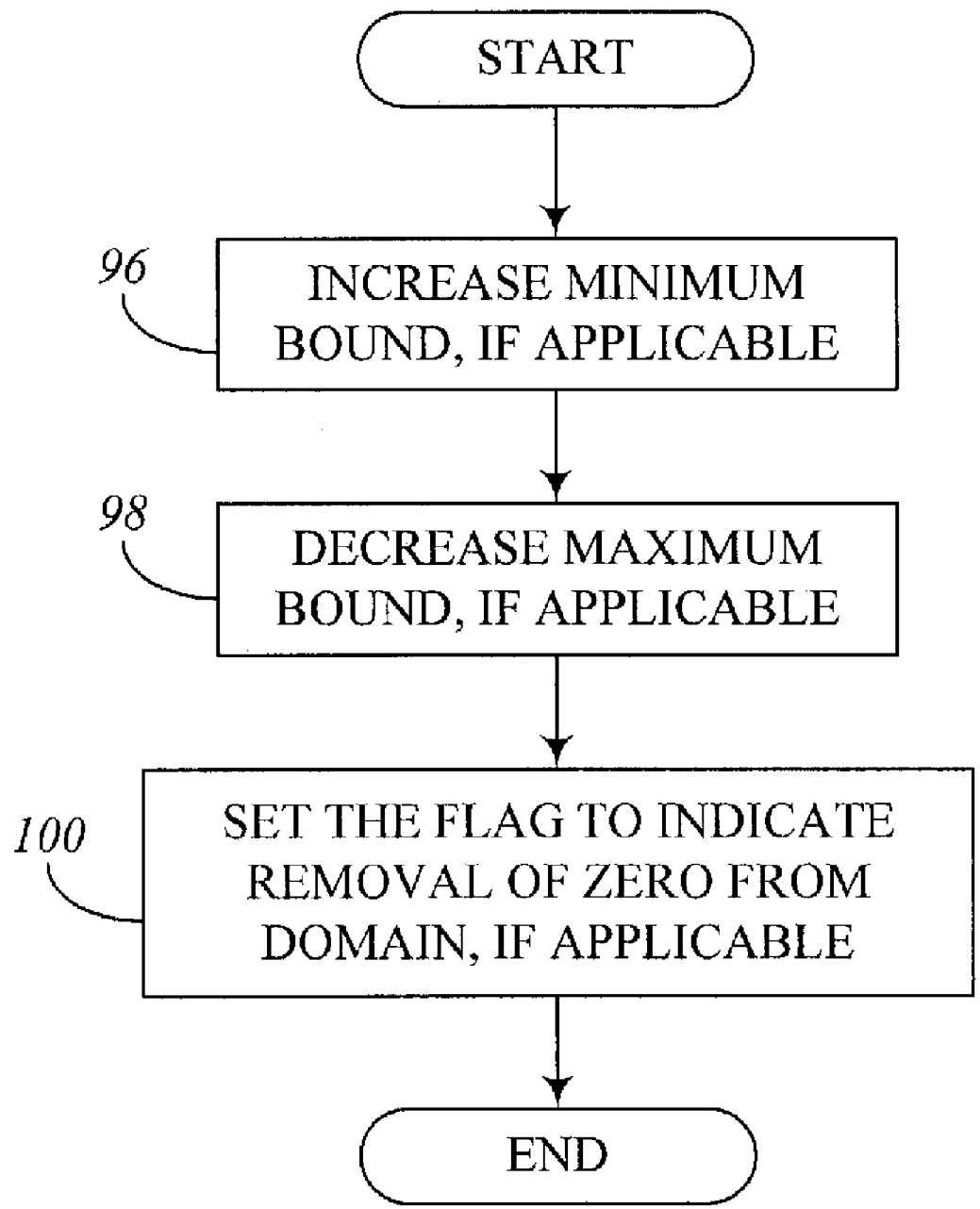
FIG. 6 is a flow diagram illustrating a domain reduction process for a floating point variable, according to one embodiment.

FIG. 6 is a flow diagram of an embodiment of a domain reduction process for a floating point variable. Specifically, this process may be a sub-routine of the domain reduction process of block 92 shown in FIG. 5. In some embodiments, the floating point variable, which is processed according to the method described herein, may be used in a CSP solving system. At the start of the routine, a minimum bound of the domain of the floating point variable is increased, if applicable, as indicated in block 96. According to block 98, the maximum bound of the domain is decreased, if applicable. As indicated in block 100, the flag is set to indicate the removal of the value zero from the domain, if applicable.

Figure 7:
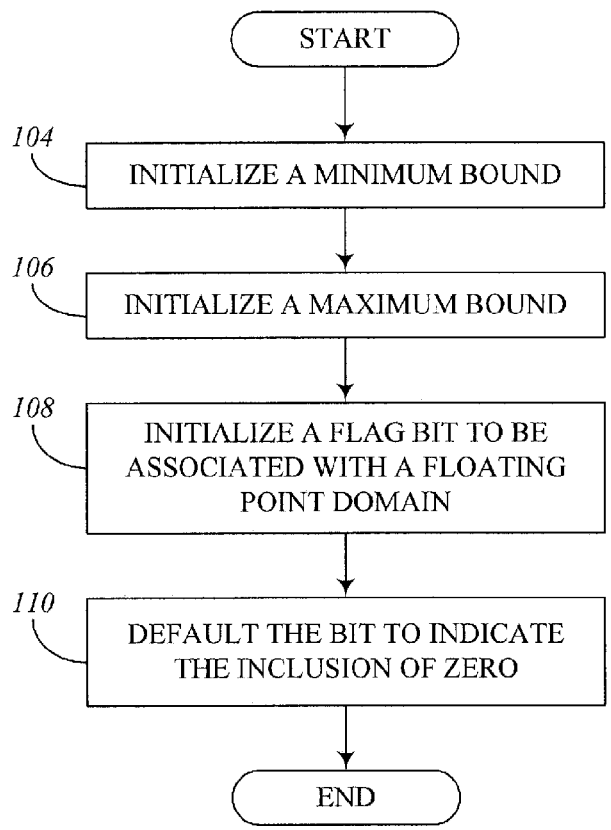
FIG. 7 is a flow diagram illustrating a method for initializing the domain of a floating point variable, according to one embodiment.

FIG. 7 is a flow diagram of an embodiment of a method for initializing the domain of a floating point variable. In some embodiments, the floating point variable whose domain is initialized according to the method described herein may be used in a CSP solving system. The method includes initializing a minimum bound of a domain of the floating point variable, as indicated in block 104. Then the maximum bound of the domain is initialized, as indicated in block 106. As indicated in block 108, a flag bit is initialized to be associated with the floating point domain. Then, as indicated in block 110, the flag bit is defaulted to indicate the inclusion of the value zero within the domain.

Figure 8:
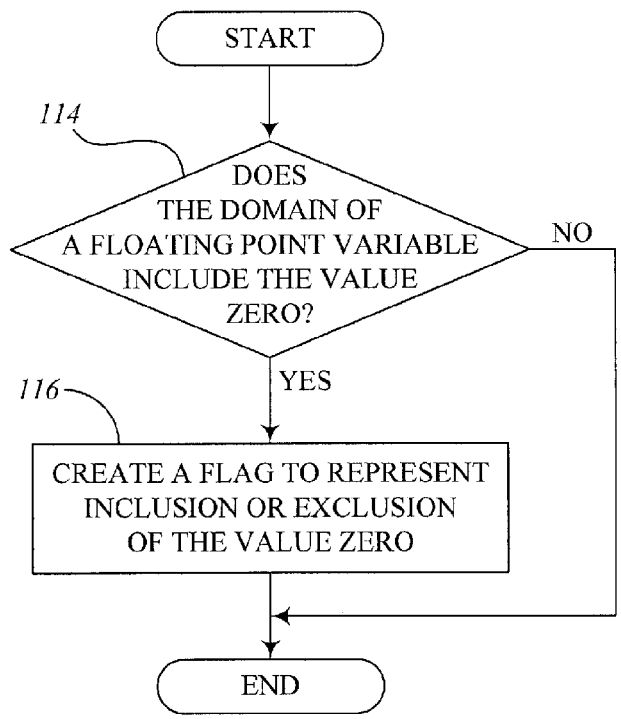
FIG. 8 is a flow diagram illustrating a method for creating a flag to indicate inclusion or exclusion of zero in a floating point variable domain, according to one embodiment.

FIG. 8 is a flow diagram of an embodiment of a method for creating a flag to indicate inclusion or exclusion of zero in a floating point variable domain. In some embodiments, the floating point variable processed according to the method described herein may be used in a CSP solving system. In this embodiment, the method includes determining whether or not the domain of a floating point variable includes the value zero by definition, as indicated in block 114. This may be determined, for example, by analyzing whether the minimum bound is negative and whether the maximum bound is positive. As indicated in block 116, a flag is created to represent the inclusion or exclusion of the value zero for the respective floating point variable. This method may be performed, for example, on floating point variables that do not initially include a special flag bit for indicated inclusion or exclusion of the value zero.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

It can be recorded whether zero is included in or excluded from the domain of a floating point variable. With this acknowledgement of the value zero, the information regarding the domain of the floating point variable is therefore enhanced. As a result, reasoning can be made over the value zero, even when zero is merely a single value in the middle of a range of numerous floating point values. The value zero is singled out because of its particular significance, and zero can therefore be reasoned over in constraint-based or rules-based systems. Also, the systems and methods described in the present disclosure can apply to the special acknowledgement of the inclusion or exclusion of any value, especially those values having particular significance. For example, the value zero can be singled out, as described herein, the value one, or other values. Also, the inference power can be increased in a problem in this regard, and the complexity of solving a problem can be reduced. Furthermore, the systems and methods can process such a floating point variable to reach a solution more efficiently.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A computer-implemented method of solving a constraint satisfaction problem, the method comprising:
   providing a floating point variable having a domain that includes a flag representing whether a specific value is included in or excluded from the domain of the floating point variable;
   analyzing a constraint on the floating point variable to determine if the constraint excludes the specific value from the domain of the floating point variable; and
   manipulating the flag to indicate that the specific value is excluded from the domain of the floating point variable when it is determined that the constraint excludes the specific value;
   wherein the flag is initially manipulated to a bit value indicating that the specific value is included in the domain of the floating point and remains set unless it is determined that the constraint excludes the specific value from the domain.

2. The method of claim 1, wherein the method further comprises:
   determining if the domain of the floating point variable includes a range of values containing the specific value; and
   initializing the flag if it is determined that the range of the domain of the floating point variable contains the specific value.

3. The method of claim 2, wherein determining if the domain includes a range of values containing the specific value further comprises analyzing if a first condition is met that a minimum value of the range of values is less than the specific value and analyzing if a second condition is met that a maximum value of the range of values is greater than the specific value.

4. The method of claim 1, wherein the constraint is able to numerically limit the domain of the floating point variable.

5. The method of claim 1, further comprising:
   analyzing a second constraint on the floating point variable to determine if the second constraint excludes the specific value from the domain of the floating point variable; and
   manipulating the flag to indicate that the specific value is excluded from the domain of the floating point variable when it is determined that the second constraint excludes the specific value.

6. The method of claim 1, wherein the specific value is zero.

7. A non-transitory computer readable medium configured to store instructions that are executable by a processing device to solve a constraint satisfaction problem, the computer readable medium comprising:
   logic adapted to analyze a constraint on a floating point variable to determine if the constraint excludes a value zero from a domain of the floating point variable; and
   logic adapted to manipulate a flag associated with the floating point variable to a value indicating that the value zero is excluded from the domain of the floating point variable when it is determined from the constraint that the value zero is excluded from the domain of the floating point variable;
   logic adapted to analyze the domain of the floating point variable to determine if the domain includes a range of values that normally contains the value zero; and
   logic adapted to create the flag and associate the flag with the floating point variable when it is determined that the range of the domain of the floating point variable contains the value zero.

8. The computer readable medium of claim 7, wherein the logic adapted to analyze the domain of the floating point variable further comprises logic adapted to determine if a minimum value of the range is less than zero and to determine if a maximum value of the range is greater than zero.

9. The computer readable medium of claim 7, wherein the logic adapted to manipulate the flag further comprises logic adapted to initially manipulate the flag to a value indicating that the value zero is included in the domain of the floating point variable.

10. The computer readable medium of claim 7, further comprising:
    logic adapted to analyze a plurality of additional constraints on the floating point variable to determine if at least one of the plurality of additional constraints excludes the value zero from the domain of the floating point variable; and
    logic adapted to manipulate the flag to the value indicating that the value zero is excluded from the domain of the floating point variable when it is determined from at least one of the plurality of additional constraints that the value zero is excluded from the domain of the floating point variable.

11. A floating point variable handling module for a constraint satisfaction problem solver, the handling module comprising:
    a processor coupled to a computer readable medium;
    a constraint analyzing module configured to cause the processor to analyze one or more constraints on a floating point variable, the constraint analyzing module further configured to determine if it can be determined from at least one of the constraints that a specific value is excluded from a domain of the floating point variable;
    a flag manipulating module configured to cause the processor to manipulate a flag associated with the floating point variable to a value indicating exclusion of the specific value from the domain when the constraint analyzing module determines that the specific value is excluded from the domain;
    a domain analyzing module configured to cause the processor to analyze the domain of a floating point variable to determine if the domain contains a continuous range of values including the specific value; and
    a flag initializing module configured to cause the processor to initialize the flag and to associate the flag with the floating point variable when the domain analyzing module determines that the floating point variable contains a domain having a continuous range of values including the specific value.

12. The floating point variable handling module of claim 11, wherein the flag manipulating module is configured to initially manipulate the flag to a value indicating inclusion of the specific value in the domain.

13. The floating point variable handling module of claim 11, wherein the specific value is the value zero.

14. A constraint satisfaction problem solver system for acknowledging a value zero in a floating point variable, the system comprising:
    means for associating a flag with the floating point variable, the flag having a first possible value for indicating that the value zero is included in a domain of the floating point variable and a second possible value for indicating that the value zero is excluded from the domain of the floating point variable;
    means for analyzing a constraint on the floating point variable to determine if the constraint excludes the value zero from the domain of the floating point variable; and means for manipulating the flag to the second possible value when the analyzing means determines that the constraint excludes the value zero; and means for determining if the domain of the floating point variable includes a range of values containing the value zero;

wherein the associating means is configured to associate the flag with the floating point variable when the determining means determines that the domain includes a range of values containing the value zero;

wherein the determining means further comprises means for analyzing if a minimum value of the range of values is less than zero and if a maximum value of the range of values is greater than zero.

15. The system of claim 14, wherein the analyzing means is further configured to analyze a plurality of additional constraints on the floating point variable to determine if at least one of the additional constraints excludes the value zero from the domain of the floating point variable.

16. The system of claim 15, wherein the manipulating means is further configured to manipulate the flag to the second possible value when it is determined that at least one of the additional constraints excludes the value zero.

17. The system of claim 14, wherein the associating means initially manipulates the flag to the first possible value.

* * * * *

UNITED STATES PATENT AND TRADEMARK OFFICE
CERTIFICATE OF CORRECTION

PATENT NO. : 8,229,869 B2  
APPLICATION NO. : 12/427914  
DATED : July 24, 2012  
INVENTOR(S) : Bagley et al.

Page 1 of 1

It is certified that error appears in the above-identified patent and that said Letters Patent is hereby corrected as shown below:

On the Title Page, Item (56) under "Other Publications", line 9, delete "Progamming," and insert -- Programming, --, therefor.

On the Title Page, Item (56) under "Other Publications", line 9, delete "www.infomatik." and insert -- www.informatik. --, therefor.

On the Title Page, Item (56) under "Other Publications", line 11, delete "Olvier," and insert -- Olivier, --, therefor.

On page 2, Item (56) under "Other Publications", line 4, delete "Shee," and insert -- Sheet, --, therefor.

On page 2, Item (56) under "Other Publications", line 6, delete ""Tacton" and insert -- "Tacton's --, therefor.

On page 2, Item (56) under "Other Publications", line 9, delete "Desigh," and insert -- Design, --, therefor.

On page 2, Item (56) under "Other Publications", line 11, delete "Programmin," and insert -- Programming, --, therefor.

Signed and Sealed this
Sixth Day of November, 2012

David J. Kappos
*Director of the United States Patent and Trademark Office*